United States Patent
Hori et al.

[15] 3,686,832
[45] Aug. 29, 1972

[54] APPARATUS FOR ELIMINATING DILUTED SULPHUR OXIDES FROM COMBUSTION EXHAUST GASES

[72] Inventors: Shin Hori, Tokyo; Tomiyoshi Inoue, Kanagawa-ken; Shozo Yamamoto, Tokyo; Kazuo Tatara, Chiba-ken; Masahiro Kitagawa, Kanagawa-ken; Masaru Watanabe, Tokyo; Yukihiko Okada, Tokyo; Naoki Negishi, Tokyo, all of Japan

[73] Assignee: Kogyo Kaihatsu Kenkyusho, Tokyo, Japan

[22] Filed: Oct. 27, 1969

[21] Appl. No.: 869,787

Related U.S. Application Data

[63] Continuation-in-part of Ser. No. 550,374, May 16, 1966, abandoned.

[30] Foreign Application Priority Data

May 18, 1965   Japan ..................... 40/28786

[52] U.S. Cl. ..................................... 55/179, 55/242
[51] Int. Cl. ........................................... B01d 53/00
[58] Field of Search .......... 55/179, 180, 73, 387, 242; 23/2, 178 S

[56] References Cited

UNITED STATES PATENTS

| | | |
|---|---|---|
| 3,473,297 | 10/1969 | Tamura et al. ................ 55/73 |
| 3,504,483 | 4/1970 | Tamura et al. .............. 55/180 |
| 2,751,034 | 6/1956 | Ringo et al. ................. 55/180 |
| 3,405,508 | 10/1968 | Peters et al. .................... 55/73 |

*Primary Examiner*—Reuben Friedman
*Assistant Examiner*—R. W. Burks
*Attorney*—Ernest G. Montague

[57] ABSTRACT

An apparatus for eliminating sulphur oxides from combustions exhaust gases comprising a plurality of compartments each containing activated carbon and means for washing the latter with water. A pair of inlet ducts, a pair of outlet ducts, and inlet and outlet flow control means associated with each compartment are provided so that the latter can be placed in communication with either of the inlet ducts and either of the outlet ducts, respectively, or isolated from all of the ducts, the inlet ducts branching from a common main duct for leading exhaust gas to the apparatus. One of the outlet ducts communicates with one of the inlet ducts at a position downstream of the branching point of the main duct and the other of the outlet ducts leads gas out of the apparatus.

8 Claims, 3 Drawing Figures

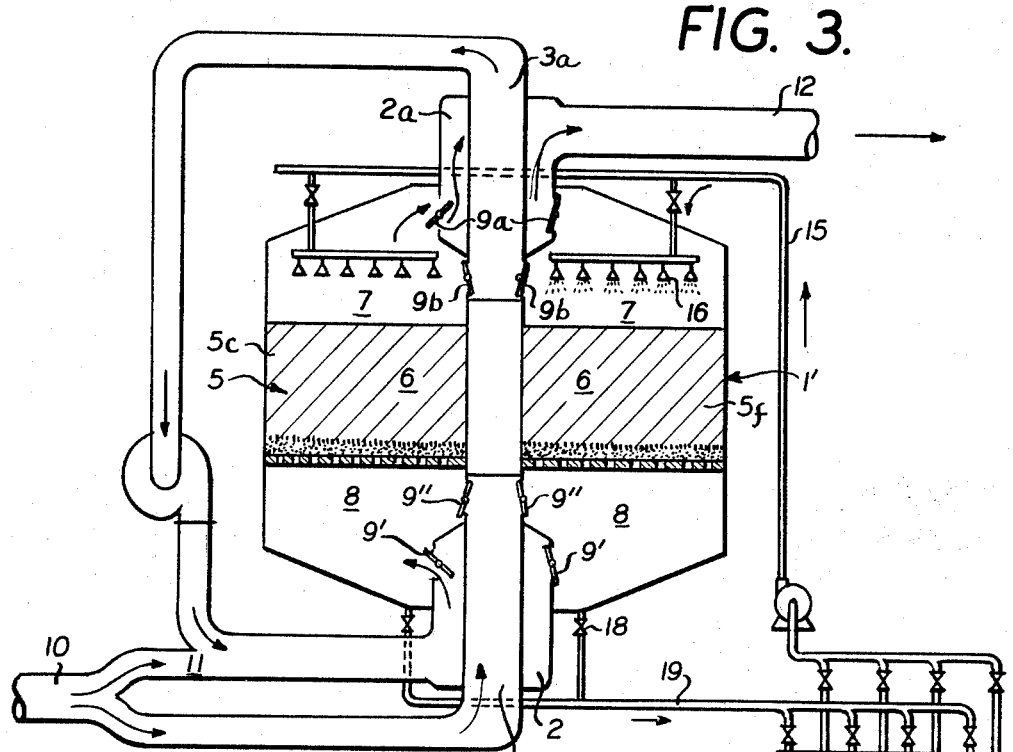
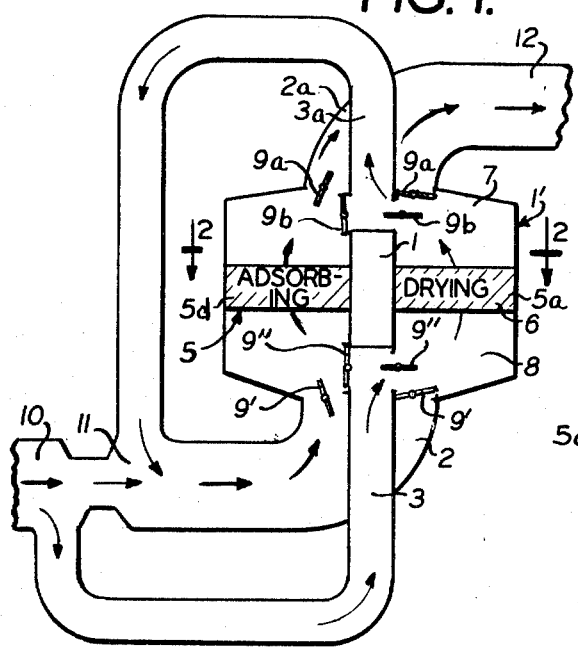
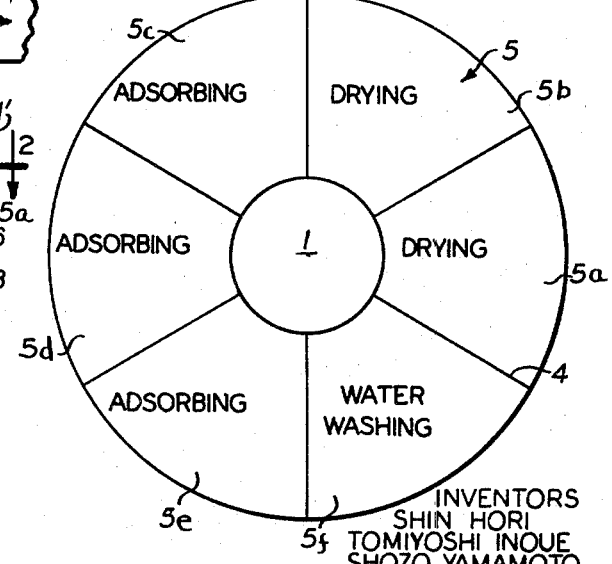
FIG. 3.
FIG. 1.
FIG. 2.
INVENTORS
SHIN HORI
TOMIYOSHI INOUE
SHOZO YAMAMOTO
KAZUO TATARA
MASAHIRO KITAGAWA
MASARU WATANABE
YUKIHIKO OKADA
NAOKI NEGISHI
BY
ATTORNEY.

APPARATUS FOR ELIMINATING DILUTED SULPHUR OXIDES FROM COMBUSTION EXHAUST GASES

This application is a continuation-in-part of our co-pending application Ser. No. 550,374, filed May 16, 1966, and now abandoned.

The present invention relates to an apparatus using activated carbon to eliminate sulphur oxides from combustion exhaust gases.

In recent years, there has been an increased use of fuel containing sulphur, e.g., heavy oil. This constitutes a serious problem in terms of a public nuisance, due to the presence of harmful sulphur oxides, i.e. $SO_2$ and $SO_3$, in the exhaust gases which arise from the combustion of such sulphur in the fuel, e.g., in electric power stations and other industrial plants. The elimination of such sulphur oxides is a very important problem to be solved from the standpoint of preventing this public nuisance, and there have heretofore been proposed a variety of counter-measures therefor. However, none of these proposals are entirely satisfactory.

Apparatus performing a wet method and a dry method have been proposed. The former is based on the principle of washing away any sulphur oxides in a gas, using water or other solvent. The drawbacks of this method are that it must be operated at a low temperature, and the exhaust gas after washing is at a low temperature. Consequently there is a great amount of condensed water vapor in the waste gas, with the result that the waste gas does not disperse efficiently when discharged from an exhaust duct into the open atmosphere.

On the other hand, systems based on the dry method use various substances as physical and chemical sorbents, including activated carbon in some cases. This has the advantage that the waste gas is discharged at a comparatively high temperature thus avoiding the difficulties mentioned above. However, it is not possible to treat large quantities of gas in this way due to the considerable expense involved in replenishing or regenerating the sorbent.

It is one object of the present invention to provide an apparatus for effectively eliminating sulphur oxides contained in exhaust gases, economically and in a manner less costly than by using activated carbon in a dry method system.

It is another object of the present invention to provide an apparatus for eliminating sulphur oxides from combustion exhaust gases comprising a plurality of compartments each containing activated carbon, means for washing the latter with water, a pair of inlet ducts, a pair of outlet ducts, and inlet and outlet flow control means associated with each compartment so that the latter can be placed in communication with either of the inlet ducts and either of the outlet ducts, respectively, or isolated from all of the ducts. The inlet ducts branch from a common main duct for leading exhaust gas into the apparatus, one of the outlet ducts communicating with one of the inlet ducts at a position downstream of the branching portion of the inlet ducts with the main duct, and the other of the outlet ducts passes out of the apparatus to lead the treated gases out of the apparatus.

The invention is particularly concerned with an apparatus wherein combustion exhaust gas containing sulphur oxides is passed through a layer of activated carbon to cause adsorption of sulphur oxides, and wherein the activated carbon after being used in the adsorption operation for a given time is washed with water, so as to remove the adsorbed sulphur oxides as an acid solution, the activated carbon being subsequently dried by a heated gas, so as to be regenerated.

The process performed by the apparatus consists of three batchwise unit operations, i.e., a combination of adsorption, washing and drying. The problems to be considered in such a process include the following.

The temperature of the gas stream in the adsorption operation should be preferably less than 130° C. This temperature can be attained either by spraying water, or by feeding air at ambient temperature, into the exhaust gas stream since the temperatures of combustion exhaust gases are generally higher than the temperature mentioned above. Alternatively the gas stream may be passed through a heat-exchanger, but the latter adds significantly to the size and cost of the necessary equipment.

In case where air is to be used as the gas in the drying operation, the air is required to be heated up to 100° C or higher to obtain a satisfactorily short drying time. Even if the outlet gas from the adsorption operation (at a temperature lower than 130° C) is used as the drying gas, such gas has to provide the latent heat required for the evaporation of water from the activated carbon in the drying operation. Consequently the temperature of the gas, which has passed through the drying process, is generally reduced to 40° to 60° C, and before the gas can be released into the open air it has to be reheated in order to improve the dispersion of gas, and to prevent mist formation. However, the cost of providing and operating the equipment for such reheating is too great to be commercially acceptable.

Although the use of heat exchangers may be considered, this too would give rise to an unacceptably great increase of the construction costs.

The present invention is based on the discovery that it is possible to use the combustion exhaust gases, before treatment to eliminate sulphur oxides, as the gas for the drying operation, and that this proves to be very effective in solving the problems mentioned above.

The apparatus performs three batchwise unit operations, i.e., the combination of adsorption, washing and drying: an adsorption operation in which the sulphur oxides are adsorbed by the activated carbon for a given time; a washing operation in which the activated carbon is then washed with water so that the adsorbed sulphur oxides are removed from the activated carbon; and a drying operation in which the activated carbon after washing is dried by passing a hot gas over the activated carbon. For the continuous treatment of gas these three unit operations must be performed simultaneously, and more than three separate carbon layers are required. In this process the exhaust gases to be treated containing the sulphur oxides to be removed, at temperatures higher than that which is suitable for the adsorption operation, are initially divided into two streams, one stream being used continuously in the drying operation as the heat source to dry the carbon. More than half of the sulphur oxides in the gases are adsorbed and oxidized to sulphuric acid by wet activated carbon during the drying operation, in spite of the high temperature of the gas itself, while at the same time the carbon layer is dried. Moreover a considerable decrease of drying time is achieved due to the generation of additional heat by adsorption, oxidation, and hydration of the sulphur oxides. The temperature of the outlet gas from the drying process is as low as 40° – 60° C (very close to the dewpoint of the inlet gas). This gas contains almost no $SO_3$, and only a low concentration of $SO_2$, with hardly any mist, i.e., condensed water vapor. This outlet gas from the drying operation having a lower concentration of sulphur oxides is mixed with the other divided stream of exhaust gases to be treated producing a gas mixture at a temperature suitable for the adsorption operation, the gas mixture then being passed into the adsorption operation so that the sulphur oxides are adsorbed.

Any solid matter, such as soot and ash in the combustion exhaust gases, which might give rise to obstruction in the layer of activated carbon, can be easily removed by providing a coke layer at the upstream side of the activated carbon, and in this way it is possible to use freely the combustion exhaust gases containing sulphur oxides as a drying gas without causing obstruction of the activated carbon layer.

Under appropriate conditions (for example, an overall contact time with the activated carbon from 2 to 10 seconds, with the combustion exhaust gases at a temperature from 130° to 160° C), the amount of the gas required for the drying operation is about 30 — 70 percent of the total amount of the gas to be treated, although this does depend on the content of sulphur oxides. Accordingly, it is possible to obtain a gas having a temperature lower than 130° C, which thereby is suitable for the adsorption operation, by mixing the outlet gas from the drying operation (having a reduced temperature) with the other stream of the high temperature combustion exhaust gas. Furthermore, there is little increase in the total volume of gas flowing through the adsorption stage despite the fact that it includes the water vapor driven off from the activated carbon in the drying stage.

Regarding the activated carbon layer, this adsorbs a part of the sulphur dioxide in the gas during the drying operation, and subsequently makes contact with a gas containing sulphur dioxide at a concentration lower than the original during the adsorption operation when the residual sulphur dioxide is eliminated by adsorption. Also the sulphur dioxide adsorbed on the activated carbon is oxidized, by oxygen which is inevitably present in such exhaust gases, to sulphur trioxide. Any sulphur trioxide present in the exhaust gases is of course also adsorbed. In this way, where the adsorption is divided in two stages and the concentration of sulphur oxides to be adsorbed differs in these stages, the overall extent of adsorption and oxidation is greater than in the case of a relatively high concentration of sulphur oxides in the gas being adsorbed in one stage. In addition, the arrangement has the advantage that it is flexible, in as much as variations in the temperature, flow rate, and sulphur oxide content of the gases undergoing treatment can be accommodated by varying the proportion of the gas which is fed directly to the drying stage.

Even if mist occurs in the gas leaving the drying operation, so long as such gas passes through the activated carbon layer again in the adsorption operation after the drying process, the outlet gas from the complete process contains no mist.

In the adsorption operation, as in the drying operation, heat is generated by adsorption, oxidation, and hydration of sulphur oxides. Accordingly, the outlet gas from the adsorption process maintains a sufficiently high temperature so as to require no heating before dispersion into the open air. The washing operation may be performed by several conventional washing methods, such as, for example, spraying of water which may be used for fixed bed apparatus. The washing operation for the fixed bed type is easily performed by spraying water on the carbon layer. It is possible to wash the carbon layer uniformly by means of the same ordinary technique as in the case of a packed tower for gas absorption. For the moving bed type of carbon layer the liquid extraction device for porous matter can be used. In either case, pseudo counter-current multistage washing (extraction) is effective in which drained water is used repeatedly for washing.

Dilute sulphuric acid obtained in the washing process is clean and may be put to many uses.

Based on the above, the elimination of sulphur oxides is effected as follows:

1. When required, a coke layer is installed on the upstream side of the activated carbon layer, to eliminate the soot, ash, etc. in the combustion exhaust gases.

2. The combustion exhaust gas is divided into two streams, one of which is used at all times in the drying operation to effect the operation by virtue of the heat content of the gas and heat arising from the reaction thereof.

3. The outlet gas from the drying operation at a relatively low temperature and with a low concentration of sulphur oxides is mixed with the other stream of the divided exhaust gas, to form a gas mixture having a temperature suited for the adsorption operation.

4. The gas mixture thus formed therefore contains $SO_2$ at a concentration lower than the original concentration and at a temperature suitable for the adsorption operation. This mixture is blown into the adsorption operation, and then after following a dry type adsorption operation over activated carbon, the resultant waste gas is allowed to disperse into the atmosphere.

The especially important features of the invention are as follows:

1. Almost no fuel, water, etc. is required, for adjustment of the temperature of the gases while the heat content of the combustion exhaust gas is efficiently used. Therefore, the operational costs involve only electricity for the blower and washing water, and consequently these costs are very low.

2. Drying of the washed activated carbon is carried out with a part of the combustion exhaust gas itself. The outlet gas from the drying operation is passed again through the activated carbon layer, in the adsorption, so that this final drying operation assures that no mist will be formed in the gas released in the air, thereby insuring the prevention of a public nuisance.

3. Since another hot gas is not used for the drying operation, the volume of inlet gas into the adsorption operation will remain almost the same as that of the original combustion exhaust gas to be treated. Therefore, an additional blower and other equipment are not required, nor is there any increase in the capacity of the equipment required. Consequently the cost of the equipment and construction is minimized.

4. The adsorption of SO₂ is carried out in two stages, i.e. first in the drying operation and second in the adsorption operation. Furthermore, it is possible freely to adjust the gas volume divided for the drying operation and the drying time under various conditions. Thus, the adaptability of the process with respect to changes of temperature, flow rate, etc., of the combustion exhaust gas to be treated, is great.

The present invention can utilize the activated carbon layer in any suitable form, for example, fixed bed, moving bed, or fluidized bed. In case of moving bed and fluidized bed, there is not much problem in the practical construction required; while in the case of a fixed bed, it requires an arrangement of three or more beds of activated carbon for the three unit operations of adsorption, washing, and drying to be exchanged and repeated in a multiple stage cycle to treat the combustion exhaust gas continuously. For a desulphurization plant unit an arrangement including a plurality of active carbon-packed towers (preferably six) can be used. However, since this arrangement comprises complex gas ducting, the apparatus described hereinafter is more convenient.

With the above and other objects in view, which will become apparent in the following detailed description, the present invention, which is shown by example only, will be clearly understood in a connection with the accompanying drawings, in which:

FIG. 1 is a schematic elevation of an apparatus for performing the process according to the invention;

FIG. 2 is a section taken along the lines 2—2 of FIG. 1 illustrating one phase of the operational cycle of an activated carbon layer in such an apparatus; and FIG. 3 is an elevation of the apparatus of FIG. 1 in somewhat greater detail illustrating the water washing of compartment 5f, during the phase of the cycle represented by FIG. 2.

The apparatus comprises an annular chamber 1' defined by internal and external cylindrical walls. Two co-axial passages 2 and 3 extend axially from the lower side of the annular chamber 1' and two similar co-axial passages 2a and 3a extend axially from the upper side thereof. The annular chamber is divided into a plurality of radially extending sectors or compartments 5 by radial partitions 4 (six such compartments being illustrated).

Each compartment 5 includes a layer 6 of activated charcoal which forms a fixed bed; each of the chamber portions 7 above this layer can be placed in connection with either passage 2a or passage 3a selectively by means of valves 9a and 9b, respectively, associated with each chamber portion 7. Similarly, each chamber portion 8 below the layer 6 can be placed in connection with either of the passages 2 and 3 selectively by means of valves 9' and 9'', respectively, associated with each chamber portion 8.

The passages 2 and 3 constitute inlet passages to the chamber 1', and the passages 2a and 3a constitute outlet passages. A main inlet duct 10 branches so that the incoming combustion exhaust gas to be treated and carried thereby is divided between passages 2 and 3. The valves 9'' are set such that the incoming combustion exhaust gases conveyed by passage 3 pass into two of the compartments, viz., compartments 5a and 5b; that is, the valves 9'' of the compartments 5a and 5b are open and the valves 9'' of the other compartments 5c, 5d, 5e and 5f are closed.

The valves 9b of these two compartments are open and the valves 9a are closed so that such gas after passing through the activated charcoal layer in these two compartments 5a and 5b, performing the drying operation therein, hereinafter described, is conveyed into and through passage 3a to join the inlet passage 2 at junction 11, where such gas mixes with the incoming combustion exhaust gas which flows directly from the main inlet duct 10 into this passage.

Three of the remaining sets of valves (9' and 9'') are set such that the gas in passage 2 passes into three of the compartments, viz., compartments 5c, 5d, and 5e, and through the activated charcoal layer therein for the adsorption process hereinafter described in more detail (i.e., valves 9' of each of these compartments are open and valves 9'' closed), and from there passes into outlet passage 2a to be discharged to the atmosphere via exit 12 (i.e., valves 9a of these compartments are open and valves 9b are closed).

Referring now again to the drawings, and more particularly to FIG. 3, illustrating the apparatus during the phase of operation represented by FIG. 2, the remaining compartment 5f, is isolated by its associated valves 9', 9'', 9a, and 9b being closed and the water in tank 14 flows through pipe 15 to valve 17 associated with compartment 5f, which valve 17 is open, and the water is sprayed on the carbon layer in this isolated compartment 5f via spray nozzles 16. The sprayed water then flows back to the tank 14 through valve 18 and line 19. Sulphuric acid is extracted as a by-product and is sent to the sulphuric acid reclaimer through pipe 20, and the water in turn is supplied through pipe 21. The valves 17 associated with each compartment, other than the then isolated compartment, are closed. The washing equipment is not illustrated in FIG. 1 for clarity, but as readily understood, each compartment includes the spray nozzles 16 and associated valve 17 for washing the carbon layer 6 in each compartment in sequence at the appropriate period in the cycle as will hereinafter be explained.

The apparatus is cyclically operated so that each compartment receives gas from the inlet passage 2 for a predetermined time. Such gas from the inlet passage 2 comprises a mixture of part of the incoming combustion exhaust gas to be treated (i.e., from the main duct 10) with the remainder being such gas which has previously been passed through compartments then serving for the drying process, i.e., in the portion of the cycle described above, compartments 5a and 5b. During such drying process, part of the sulphur oxide contained in the gas is removed, and the gas is cooled so that the mixed gas flowing in passage 2 has a reduced concentration of sulphur oxides and a reduced temperature in comparison with that flowing in the main duct 10. Such gas passing through the compartments then serving as the adsorption process (i.e., in the portion of the cycle described above, compartments 5c, 5d and 5e), is subject to a dry adsorption process wherein substantially all of the remaining sulphur oxides are removed before the gas is discharged to the atmosphere through exit duct 12.

The valves 9', 9'', 9a and 9b associated with each compartment are operated such that each compartment performs the adsorption process for a predetermined time and the valves are then switched so that each compartment is washed for a predetermined time, after which the valves are again switched so that each compartment is used in the drying operation.

In the illustrated embodiment, after a predetermined time the appropriate valves 9', 9'', 9a and 9b of the compartments are switched such that: the previously washed and isolated compartment 5f is now used as a drying compartment; previous drying compartment 5b is now used as an adsorbing compartment (compartment 5a again being used for drying without any change in the valve setting for this compartment); and previous adsorbing compartment 5e is now isolated and is washed with water by opening the associated valves 17 (compartments 5c and 5d again being used for adsorbing, no change in the valves 9', 9'', 9a and 9b being required for these compartments 5c and 5d).

Again after the predetermined time the appropriate valves 9', 9'', 9a and 9b of the compartments are switched now such that: the previously washed and isolated compartment 5e is now used as a drying compartment; previous drying compartment 5a is now used as an adsorbing compartment (compartment 5f again being used for drying), and previous adsorbing compartment 5d is now isolated and is washed with water (compartments 5b and 5c again being used for adsorbing).

Again after the predetermined time the appropriate valves 9', 9'', 9a and 9b of the compartments are switched now such that: the previously washed and isolated compartment 5d now used as drying compartment; previous drying compartment 5f is now used as an adsorbing compartment (compartment 5e again being used for drying), and previous adsorbing compartment 5c is now isolated and is washed with water (compartments 5a and 5b again being used for adsorbing).

Again after the predetermined time the appropriate valves 9', 9'', 9a and 9b of the compartments are switched now such that: the previously washed and isolated compartment 5c now used as drying compartment; previous drying compartment 5e is now used as an adsorbing compartment (compartment 5d again being used for drying, and previous adsorbing compartment 5b is now isolated and is washed with water (compartments 5f and 5a again being used for adsorbing).

Again after the predetermined time the appropriate valves 9', 9'', 9a and 9b of the compartments are switched now such that: the previously washed and isolated compartment 5b now used as drying compartment; previous drying compartment 5d is now used as an adsorbing compartment (compartment 5c again being used for drying, and previous adsorbing compartment 5a is now isolated and is washed with water (compartments 5e and 5f again being used for adsorbing).

After the next predetermined time interval, the valves 9', 9'', 9a and 9b are switched such that the compartments function as first described and as labeled in FIG. 2, and the cycle repeats.

In this manner the activated charcoal layers 6 of each compartment are successively regenerated without stopping the process of removing the sulphur oxides from the combustion exhaust gases.

The incoming exhaust combustion gases are divided into streams in conduits 11 and 3. The hot gases in conduit 3 dry the previously washed activated carbon layer (since as described above, after a compartment is water washed it is then used to receive the gases from conduit 3 for the drying step), and then mix with the stream in conduit 11. The drying stream from conduit 3 after the drying is somewhat cooler than the exhaust combustion gases in conduit 10 and has reduced sulphur oxides (removed to a substantial degree in the drying step). Such effects on the treated stream in conduit 3 upon mixing in conduit 11 with the incoming exhaust combustion gases provides a combustion gas which is at preferable conditions for dry adsorbing in carbon layers 5c, 5d and 5e. Such adsorbing produces a moist-free stream of minimum sulphur oxide for dispersion into the atmosphere via exit 12 after passing through layers 5c, 5d and 5e. The remaining activated carbon 5f is washed with water to remove adsorbed sulphur oxides for regeneration. The activated carbons used in the drying, adsorbing and water washing steps are cyclicly treated with the above-mentioned steps at predetermined time intervals to regenerate all activated carbon sections. The flow control valves 9', 9'', 9a and 9b are adapted for this cyclic changing of the flow to the selected activated carbon sections. The water system for washing the sections sequentially also includes its own valve system, valves 17, 18, etc. schematically indicated in FIG. 3 of the drawing.

In the present invention, the sulphur oxides in the gases are adsorbed and oxidized to give sulphuric acid, so the combustion exhaust gases should include at least a chemically equivalent volume of oxygen for the oxidation. Furthermore, the concentration of $SO_2$ in the exhaust gas depends upon the sulphur content of the fuel, but is usually less than 0.2 vol. percent. However, the present invention may be applied at even higher concentrations than 0.2 percent. According to the present invention, it is possible to simply and economically eliminate the sulphur oxides contained in the combustion exhaust gases.

The present invention is further illustrated by the following examples, using the exhaust gas from a combustion of heavy oil, having the following analysis:- $HO_2$ 11.3%, $O_2$ 3.5%, $SO_2$ 1450 ppm (based on dry gas) $N_2$ 73.6%, $CO_2$ 11.5%, 523 m$^3$/hr, 130°—145° C. Throughout this specification percentages are expressed as volume percentages and absolute volumes have been corrected to Standard Temperature and Pressure conditions.

The above mentioned gas, after passing through a coke layer to remove soot and ash, was transferred to the drying operation at a flow rate of 210 m$^3$/hr. The outlet gas from the drying operation was at 56°C, and 222 m$^3$/hr. The $SO_2$ concentration had decreased to 360 ppm. The remaining gas at 130°—145° C and 313 m$^3$/hr, was mixed with this outlet gas to produce a gas at 94°—104° C and 535 m$^3$/hr. with a concentration of $SO_2$ of 1000 ppm, such temperature being suitable for the adsorption operation. This gas was blown into the adsorption operation for 4 seconds of contact time (activated carbon from anthracite was used as the adsorbent), and the outlet gas from the adsorption operation was released to the atmosphere at 104°—114° C, the $SO_2$ concentration being 50—150 ppm. This gas contained no mist, presenting no public nuisance.

The desulphurization ratio was 90—97 percent based on a continuous operation on the fixed bed apparatus having six compartments containing activated carbon as described above, three being used for adsorption, two for drying, and one for washing at any given time, using a cycle of 5 hours washing, 10 hours drying, 15 hours adsorption. In addition, the sulphuric acid by-product was of such grade as to be fully available for the production of gypsum and ammonium sulphate.

Next, the test was carried out with half the previous volume of gas to be treated using the equipment of the same size. In this case, the cycle was maintained, changing the washing time to 10 hours, drying to 20 hours and adsorption to 30 hours, and a similar result was obtained. In addition, the desulphurization ratio increased to 95—99 percent. The tests show the great adaptability of the process with respect to changes of temperature and flow rate.

We claim:

1. An apparatus for eliminating sulphur oxides from combustion exhaust gases comprising
   a single substantially cylindrical vessel partitioned into a plurality of sector-shaped compartments each containing activated carbon,
   means for selectively washing the latter with water,
   a pair of inlet ducts to the interior of one end of said vessel,
   a pair of outlet ducts from the other end of said vessel interim,
   inlet and outlet flow control means disposed in said cylindrical vessel associated with each compartment and on each of said ducts so that the former can be placed in communication with either of said inlet ducts and either of said outlet ducts, respectively, or isolated from all of said ducts, selectively,
   a common main duct for leading exhaust gas into said inlet ducts,
   said inlet ducts branching at a branching portion from said common main duct,
   one of said outlet ducts directly communicating with one of said inlet ducts at a position downstream of said branching portion of said inlet ducts with said main duct, and
   the other of said outlet ducts passes out of said apparatus leading finally treated gases out of said apparatus, 2. The apparatus, as set forth in claim 1, wherein
   said plurality of compartments together form an annular chamber, and
   an activated carbon layer disposed in each of said compartments dividing each of said compartments into an inlet region and outlet region.

3. The apparatus, as set forth in claim 2, wherein
   said inlet flow control means associated with each compartment includes at least two inlet valves, and
   said outlet flow control means associated with each compartment includes at least two outlet valves.

4. The apparatus, as set forth in claim 3, further comprising
   said means for washing constitutes means in said compartments for spraying with water.

5. The apparatus, as set forth in claim 4, wherein
   said at least two inlet and outlet valves of one of said compartments are all closed when said washing means washes said one of said compartments.

6. The apparatus, as set forth in claim 5, wherein
   one of said at least two inlet valves of at least one other of said plurality of compartments is opened so that said other of said inlet ducts communicates therewith thereby passing said exhaust gas initially into said at least one other of said plurality of compartments, the latter serving as a drying chamber,
   one of said at least two outlet valves of said at least one other of said plurality of compartments is opened so that the latter communicates with said one of said outlet ducts,
   one of said at least two inlet valves of at least one another of said plurality of compartments is opened so that said one of said inlet ducts communicates with said at least one another of said plurality of compartments, the latter serving as an adsorbing chamber, and
   one of said at least two outlet valves of said at least one another of said plurality of compartments is opened so that the latter communicates with said other of said outlet ducts.

7. The apparatus, as set forth in claim 6, wherein
   said inlet and outlet flow control means of said plurality of compartments are periodically reset so that each of said plurality of compartments is isolated from said gases and for being washed, sequentially, while the other of said plurality of compartments serves as said drying chamber and said adsorbing chamber, and in that order acting on said gases to be treated.

8. The apparatus, as set forth in claim 1, wherein
   each of said pairs of inlet ducts and outlet ducts, respectively, coaxially enter said cylindrical vessel, and
   the inner coaxial ducts of each of said pair of ducts having innermost portions extending further inwardly in said vessel than the outer coaxial ducts, and said inlet and outlet flow control means associated with the inner coaxial ducts being disposed on said innermost portions.

* * * * *